(12) United States Patent
Catchmark et al.

(10) Patent No.: US 6,985,663 B2
(45) Date of Patent: Jan. 10, 2006

(54) OPTICAL WAVEGUIDES AND GRATING STRUCTURES FABRICATED USING POLYMERIC DIELECTRIC COMPOSITIONS

(75) Inventors: Jeffrey M. Catchmark, Bellefonte, PA (US); Guy P. Lavallee, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 19 days.

(21) Appl. No.: 10/960,314

(22) Filed: Oct. 6, 2004

(65) Prior Publication Data

US 2005/0117843 A1    Jun. 2, 2005

Related U.S. Application Data

(62) Division of application No. 10/206,144, filed on Jul. 26, 2002, now Pat. No. 6,826,333.

(60) Provisional application No. 60/307,908, filed on Jul. 26, 2001.

(51) Int. Cl.
*G20B 6/10* (2006.01)
(52) U.S. Cl. .......................... 385/129; 385/37; 385/14
(58) Field of Classification Search .................... 385/8, 385/10, 14, 24, 37, 129, 131, 122; 430/321; 556/453; 372/102
See application file for complete search history.

(56) References Cited

U.S. PATENT DOCUMENTS

| 4,724,260 A | 2/1988 | Kirchhoff et al. ........... 546/112 |
| 4,812,588 A | 3/1989 | Schrock ....................... 556/453 |
| 5,136,069 A | 8/1992 | DeVries et al. .............. 568/772 |
| 5,138,081 A | 8/1992 | DeVries et al. ............... 528/49 |
| 5,264,646 A | 11/1993 | DeVries et al. ............. 585/641 |
| 6,083,661 A | 7/2000 | Oaks et al. ............... 430/286.1 |
| 6,421,472 B1 | 7/2002 | Moroni et al. ................ 385/14 |
| 6,819,845 B2 * | 11/2004 | Lee et al. .................... 385/122 |
| 6,826,333 B2 * | 11/2004 | Catchmark et al. ........... 385/37 |

OTHER PUBLICATIONS

International Search Report dated Apr. 17, 2003 from corresponding PCT Application No: PCT/US02/23740.

* cited by examiner

*Primary Examiner*—Phan T. H. Palmer
(74) *Attorney, Agent, or Firm*—Ohlandt, Greeley, Ruggiero&Perlell. L.P.

(57) ABSTRACT

Using polymeric dielectric materials (preferably materials derived from bisbenzocyclobutene monomers) and an electron beam lithography process for patterning this material, we have developed a process for fabricating optical waveguides with complex integrated devices such as gratings. Such gratings are not limited to one-dimensional type gratings but can include 2 dimensional gratings such as curved gratings or photonic crystals. Due to the properties of BCB, this process could also be implemented using optical photolithography depending upon the waveguide dimensions desired and the grating dimensions desired. Alternatively, the optical waveguide could be patterned using optical lithography and the grating can be patterned using electron beam lithography. In addition, the general process described below can be applied to the fabrication of complex lightwave circuits containing, for example, multiple optical waveguides, couplers/splitters, grating based filters and even more complex devices and structures.

20 Claims, 12 Drawing Sheets

OPTICAL WAVEGUIDES AND GRATING STRUCTURES FABRICATED USING POLYMERIC DIELECTRIC COMPOSITIONS

This application claims priority from U.S. Provisional Application No. 60/307,908 filed Jul. 26, 2001. This application also claims priority from and is a Divisional of U.S. patent application Ser. No. 10/206,144, Filed on Jul. 26, 2002 now U.S. Pat. No. 6,826,333.

BACKGROUND OF THE INVENTION

1. Field of the Invention

The present invention relates to a novel production method for optical waveguides and gratings and related devices. More particularly, the invention relates to a method of fabricating optical devices including waveguides and gratings using photosensitive polymeric dielectric compositions using electron beam lithography.

2. Description of the Prior Art

Optical devices employing waveguides and/or some type of wavelength selective device such as a grating are of critical importance to the fiber optic telecommunications industry. Optical telecommunications systems employing technologies such as Wavelength Division Multiplexing (WDM) use a variety of wavelength selective optical devices. Lowering the cost of telecommunications systems is a critical factor in delivering more services to customers at a lower cost-per-customer. The cost of installing, upgrading or expanding a fiber optic network system is typically dominated by 2 factors: cost of installation and cost of the fiber optic components. Lowering the cost of fiber optic components could make a significant impact on cost-per-customer of delivering additional telecommunications services.

One factor involved in the cost of manufacturing fiber optic components employing integrated optical elements is the cost of fabricating the actual chip that contains the optical waveguides, gratings, etc. Precise control over the fabrication process is needed and any process for making such devices should be able to be made in high volumes with as few steps as possible. In addition, any manufacturing platform should be versatile enough to allow for many different types of devices to be easily fabricated, enabling a variety of new devices to be developed.

In order to address this need, many processes for fabricating integrated waveguides using many materials have been explored. Silicon On Insulator (SOI) technology has been successfully used to fabricate a variety of waveguides and waveguide devices. In addition, polymer based waveguides have also been explored. One material in particular, which has been considered for use as an optical waveguide, is bisbenzocyclobutene (BCB). This material has been shown to exhibit low optical loss, excellent planarization characteristics and the ability to withstand high optical power densities.

Yet another very important aspect of many optical devices is the active tuning or changing of their optical characteristics by using some controllable optical, electrical, thermal and/or mechanical property. This is particularly critical for telecommunications applications such as dense wavelength division multiplexing (DWDM). More specifically, tunable optical filters for DWDM channel separation/multiplexing or tunable gain flattening filters for optical amplifiers are very important to emerging telecommunications systems. In addition, tunable dispersion compensation gratings are very important for long haul multi-gigabit telecommunications.

Accordingly, it is an object of the present invention to provide a new and improved method of making optical waveguides using dielectric materials.

Another object of the present invention is to provide a method of making optical devices having waveguides and gratings using dielectric materials.

A further object of this invention is to provide a method of making optical devices having waveguides and gratings where the accuracy of the physical dimensions of the gratings is between 5 nm and 50 nm.

A further object of the present invention is to provide a method of making optical devices having waveguides and gratings using dielectric materials and electron beam lithography.

A further object of this invention is to provide optical devices and methods for manufacturing those optical devices whose optical characteristics can be tuned.

SUMMARY OF THE INVENTION

Using polymeric dielectric materials (e.g. materials derived from bisbenzocyclobutene monomers) and an electron beam lithography process for patterning this material, we have developed a process for fabricating optical waveguides with complex integrated devices such as gratings. Such gratings are not limited to one-dimensional type gratings but can include 2 dimensional gratings such as curved gratings or photonic crystals. Due to the properties of BCB, this process could also be implemented using optical photolithography depending upon the waveguide dimensions desired and the grating dimensions desired. Alternatively, the optical waveguide could be patterned using optical lithography and the grating can be patterned using electron beam lithography. Gratings with much more dimensional precision can be fabricated using electron beam lithography. Gratings fabricated with precise dimensional control are required, for example, for many applications including Dense Wavelength Division Multiplexing (DWDM) for telecommunications applications. In addition, the general process described below can be applied to the fabrication of complex lightwave circuits containing, for example, multiple optical waveguides, couplers/splitters, grating based filters and even more complex devices and structures. Many other variations on these devices and structures as well as other structures can be developed using this process as would be apparent to anyone skilled in the art.

The present invention discloses various optical devices and a method of producing an optical device having integrated waveguide and grating structures comprising: applying onto a cladding material an energy sensitive composition to produce an first energy sensitive coating on said cladding; patternwise exposing said first energy sensitive coating with an energy source to produce a first coating having exposed and unexposed regions; contacting a developer and said first coating having exposed and unexposed regions to selectively remove said unexposed regions to produce a first patterned layer; curing said first patterned layer to produce a waveguide structure; applying an energy sensitive composition onto said waveguide structure to produce a second energy sensitive coating; patternwise exposing said second energy sensitive coating with an energy source to produce a second coating having exposed and unexposed regions; contacting a developer and said second coating having exposed and unexposed regions to selectively remove said unexposed regions to produce a second patterned layer; and curing said second patterned layer to produce a grating structure thereby producing an optical device having integrated waveguide and grating structures. The energy source is selected form the group consisting of electron beam energy and optical radiation. Cladding material has an index of refraction less than the energy sensitive composition and is perferably spin on glass or silicon dioxide. Cladding material may be first applied to a substrate and may be applied to said substrate by plasma enhanced chemical vapor deposition.

The substrate may be selected form the group consisting of: semiconductors glasses, plastics, polymers, metals, ceramics, insulators, organic materials, inorganic materials, and any combinations thereof. Where the substrate is ceramic, BCB may be applied to the ceramic prior to applying cladding material. Where the energy source is electron beam energy the patterned layers can be nano-scale patterned layers. Where the energy source is optical radiation, the patterned layers can be micro-scale patterned layers.

The energy sensitive composition is selected form the group consisting of: momomers, oligomers, and polymers and any combinations thereof. The energy sensitive composition is a preferably a dielectric composition and preferably a dielectric polymer. The energy sensitive composition of the invention is electron beam or optical radiation curable, organic soluble mixture comprising at least one oligomerized cyclobutarene made from a cyclobutarene monomer bridged by oranopolysiloxane and at least one photosensitive agent in an amount sufficient to convert the mixture to a polymer insoluble in a development solvent upon exposing the mixture to electron beam or optical radition. The oganopolysiloxane of the mixture may be divinyltetramethydisiloxane. The photosensitive agent may be a poly(aryl azide) such as 2,6-bis(4-azidobensylidene)4-alkylcyclohexanone or 2.6-bis(4-azidobenzylidene)-4-methylcyclohexanone. The mixture may contain an antioxidant derived form 1,2, dihydro-2,2,4-trimethyquinoline. The energy sensitive composition is preferably bisbenzocyclobutene (BCB).

The first energy sensitive coating may be soft baked prior to patterwise exposing this coating with an energy source. Also, the second energy sensitive coating is may be soft baked prior to patterwise exposing this coating with an energy source.

The optical device of the invention may have a plurality of waveguides and a plurality of gratings.

Other features and advantages of the present invention will be apparent from the following detailed description, and from the claims.

DETAILED DESCRIPTION OF THE INVENTION

Figure 1:
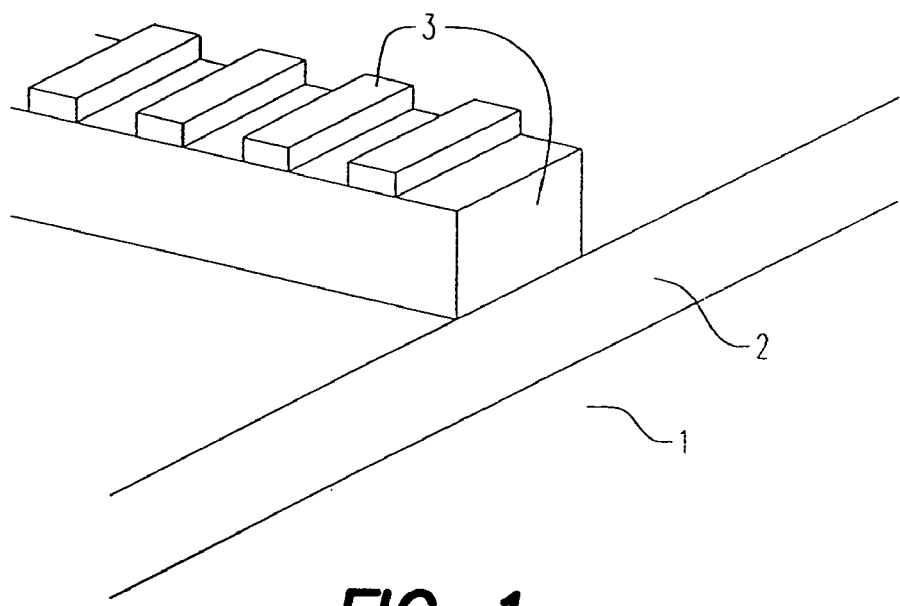
FIG. 1 is a schematic drawing of a BCB waveguide with integrated BCB grating. It is a perspective view of a cross-section. The waveguide area does not have to be BCB.

There are several methods currently used in the industry for fabricating optical devices as described above. Passive optical devices such as waveguides or gratings or combinations of these devices can be fabricated using Silicon-on-insulator (SOI) technology or even using combinations of optically suitable polymers. BCB is an optically suitable polymer and has been used to make optical waveguides or grating structures. The fabrication of more complex optical devices which integrate both waveguides and gratings, however, is currently complex and requires many processing steps. Moreover, the accuracy if the physical dimensions of typical optical gratings needed to produce devices with good optical characteristics is quite high and can be on the order of 5 to 50 nm.

Moreover, there is a need for low cost tunable optical devices where the optical response of the device can be changed. One method of fabricating tunable optical devices involves exploiting the change in the index of refraction of a material by changing the temperature of the material. The optical wavelength or frequency response of an optical device such as a grating, for example, is typically highly dependent upon the index of refraction of the material. The index of refraction of most materials is dependent upon the temperature of the material. This characteristic is commonly used in the optoelectronics industry, for example, as a way to tune 1550 nm Distributed Feedback (DFB) semiconductor lasers to a desired wavelength to compensate for device structure variations that occur during the manufacturing process.

By exploiting the temperature dependence of BCB, the optical characteristics of structures such as, for example, grating structures or photonic bandgap structures, fabricated using BCB (in whole or in part) can be tuned. This tuning can be accomplished by varying the temperature of an entire device or more refined or useful tuning can be accomplished by tuning sections or regions of a device fabricated using BCB in part or in whole. As an example, this localized tuning of particular regions of a device can be accomplished by integrating resistive heating elements into the device structure. Heating of particular regions of a device can also be accomplished using a sufficiently large and focused optical stimulus. Resistive heating elements are attractive since they can be integrated onto a Silicon wafer or chip using standard semiconductor processing techniques as known to those skilled in the art. Optical devices such as, for example, gratings using BCB can also be fabricated on silicon wafers. Heating of an entire device can be accomplished, for example, by using a thermoelectric cooler.

A second method of fabricating tunable optical devices is to introduce a stress or strain or physical deformation of some kind. This is a method currently used in the industry for tuning dispersion compensating fiber optic Bragg gratings. Since optical devices employing BCB can be fabricated on many substrates, including substrates which can be deformed, the introduction of stress or strain or physical deformation of some kind can be used to alter the wavelength or frequency response of devices made from BCB in part or in whole. Such physical deformation can be introduced in a variety of ways including special packaging or by integrating the device structure with some type of Micro Electro Mechanical System (MEMS).

Yet another important aspect of optical devices for many applications is how robust the device is to variations in the environment in which the device is operating. Future optical networks may require a substantial portion of the devices and components composing the network be located in the field, outside of any building or structure which may shield the device or component from extremes in temperature, humidity or even shock and vibration. BCB and other materials mention herein are stable to high temperatures. Once cured, BCB can be exposed to a temperature of 300° C. This advantage, along with the inherent simplicity and stability of the materials and structures, may allow the devices described herein to become ideal for field deployed optical networks.

The dielectric polymers useful in the present invention are those polymers capable of being patterned using electron-beam lithography. A particular family of useful compositions are the cyclobutanes described in U.S. Pat. No. 6,083,661 to Oaks et al. hereby incorporated by reference. More specifically, those compositions obtained from bisbenzocyclobutene monomers are especially preferred. These compounds are often bridged by organopolysiloxane (e.g. divinyltetramethyldisiloxane). They can be prepared by methods disclosed in U.S. Pat. Nos. 4,724,260; 4,812,588; 5,136,069; 5,138,081; and 5,264,646. These patents are hereby incorporated by reference. Particularly preferred compounds of the present invention were obtained from The Dow Chemical Company and are known as CYCLOTENE®. CYCLOTENE® is the trade name for both the photosensitive and non-photosensitive versions of DOW's 4022 PBCB (which is a composition typically consisting of 26–44% B-staged divinylsiloxane-bis-benzocyclobutene, 50–73% Mesitylene, 0.3–3.1% Polymerized 1,2-dihydro-2,2,4-trimethylquinoline and 0.3–2.7% of 2,6-bis{(4-azidophenyl)methylene}4-ethylcyclohexanone. The other variations of the 4000 series CYCLOTENE® products contain variations in the relative concentrations of the above compounds.

Certain processing work of the present invention is in part related to methodology for the patterning of photosensitive polymeric dielectric compositions Using E-beam Lithography and electronic structures and devices manufactured by this methodology. Co-pending U.S. patent application Ser. No. 10/164,841, filed Jun. 7, 2002, herein incorporated by reference, discloses a novel method of patterning dielectric polymeric material (e.g. BCB) using electron beam lithography. In this case, very fine feature resolution (<50 nm) can be achieved, making BCB potentially useful for the fabrication of complex optical devices such as gratings. These patterning techniques are used in the present inventive processes and include dilution of the BCB with Dow Chemical T1100 (T1100 is composed of B-staged divinylsiloxane-bis-20–39%, benzocyclobutene Mesitylene 61–70%, Polymerized 1,2-Dihydro-2,2,4- trimethyl quinoline .01–10%) to reduce the thickness of the spin-on dielectric thickness and exposing the BCB to relatively low electron doses. Using a Leica EBPV-5M electron beam lithography system operating at 50 keV, doses as low as 32 $\mu C/cm^2$ were used to expose layers of BCB as thick as 400 nm. Lower doses are possible, especially for thinner layers. Development process parameters also deviated from those used for typical optical patterning processes and vary depending upon the thickness of the BCB layer.

Referring now to the schematic drawing of a BCB waveguide with integrated BCB grating shown in FIG. 1, exposed areas of BCB 3 are located on silicon dioxide 2 which is on a substrate 1. The exposed area refers to the area of BCB exposed by electron beam lithography or optical lithography.

Figure 2:
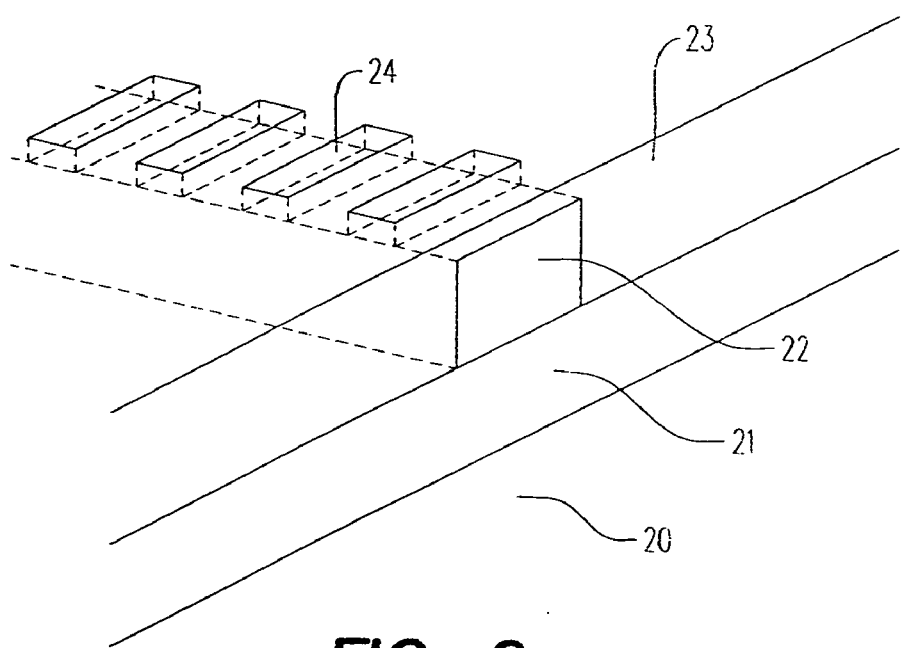
FIG. 2 is a schematic drawing of a waveguide with a BCB cladding and integrated BCB grating. It is a perspective view of a cross-section.

In the schematic drawing of a waveguide with BCB cladding and integrated BCB grating of FIG. 2, shown is substrate 20, lower cladding material 21, a waveguide core 22, exposed areas of BCB cladding 23, and removed BCB 24. The exposed area of BCB refers to the area exposed by electron beam lithography or optical lithography.

Figure 3:
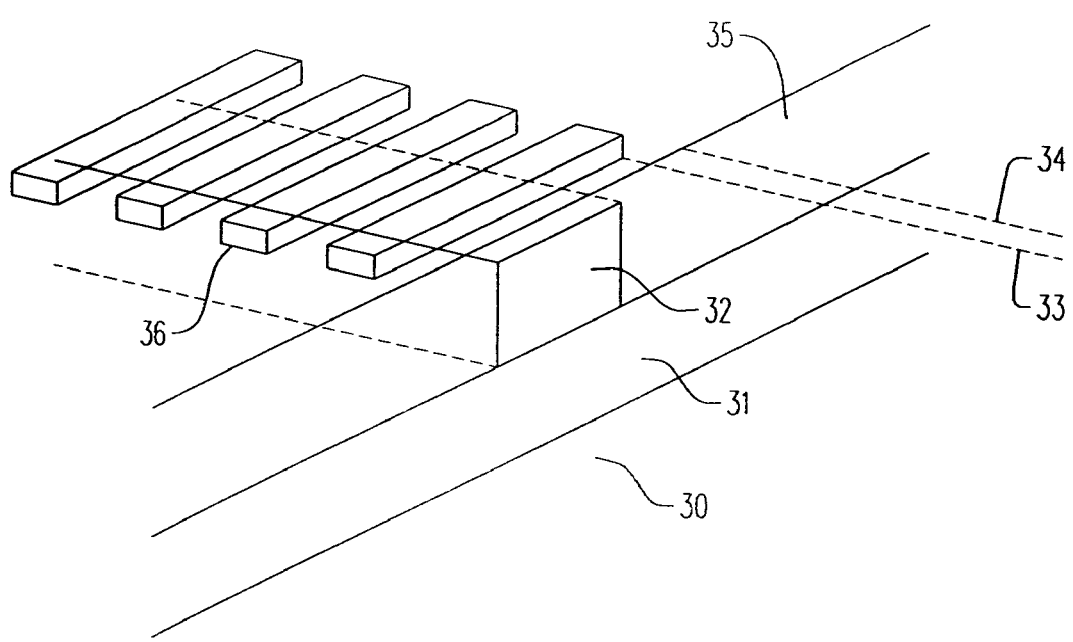
FIG. 3 is a schematic drawing of a waveguide with a BCB cladding and integrated BCB grating fabricated using an additional BCB layer (grating layer) deposited on top of the BCB cladding layer. Shown is a perspective view of a cross-section. The thickness of the grating layer is the height of the grating.

In the schematic drawing of FIG. 3 of a waveguide 32 with a BCB cladding and integrated BCB grating fabricated using an additional BCB layer (grating layer) deposited on top of the BCB cladding layer, illustrated is substrate 30; lower cladding material 31; the thickness of the BCB grating layer is shown between 33 and 34; BCB cladding (exposed area) 35; and BCB grading made from the BCB 36.

Figure 4:
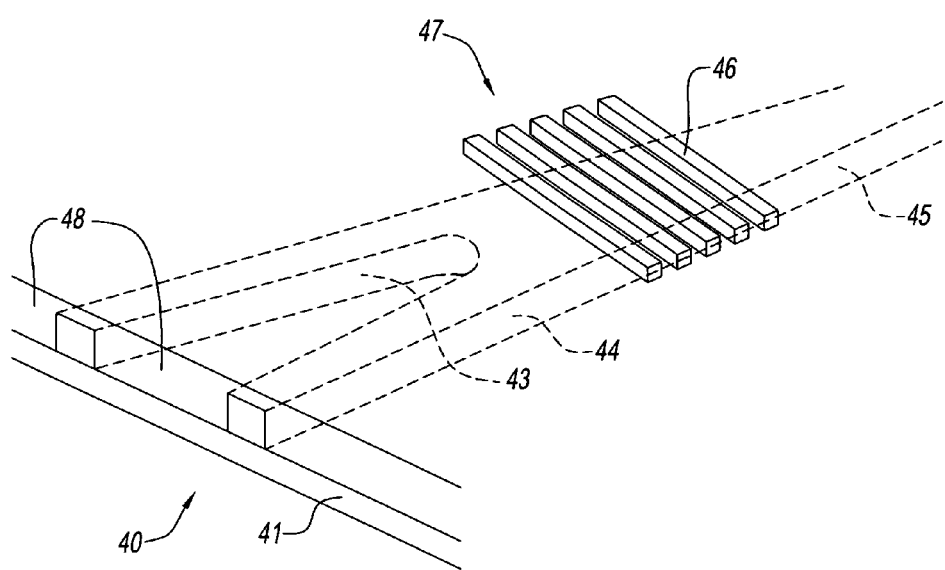
FIG. 4 is a schematic drawing of an optical filter composed of 3 waveguides (waveguide 3 not fully shown) with a BCB cladding and integrated BCB grating (which has been designed to act as an optical filter as known to those skilled in the art) fabricated using an additional BCB layer (grating layer) deposited on top of the BCB cladding layer (a perspective view of a cross-section). The thickness of the grating layer is the height of the grating.

FIG. 4 is a schematic drawing of an optical filter. The optical filter has three waveguides, 43, 44, and 45 with a BCB cladding and integrated BCB grating fabricated using an additional BCB layer (grating layer) deposited on top of the BCB clading layer. The third waveguide 45 is not fully shown in the perspective view of a cross-section. Shown is substrate 40, lower cladding material 41, waveguide core 47, BCB grating 46 made from the BCB grating as discussing in Example 3, grating region 47, and exposed area of BCB cladding 48. Additional details of the general structure are shown in FIG. 3.

Figure 5:
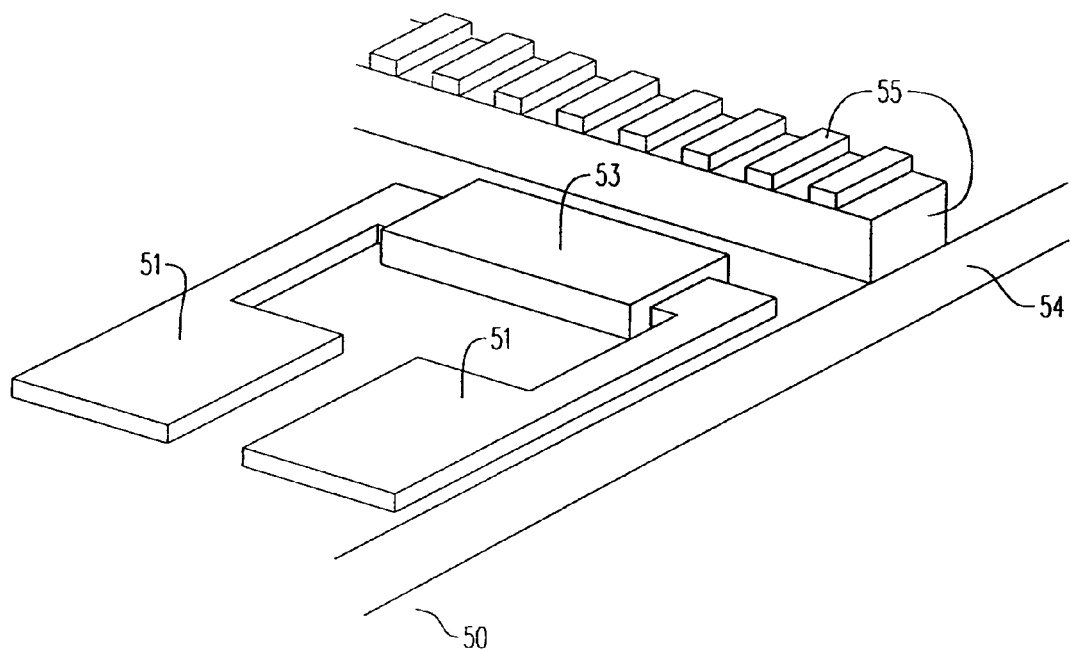
FIG. 5 is a schematic drawing, not to scale, of a BCB waveguide with integrated BCB grating. Illustrated is a perspective view of a cross-section

The schematic drawing of FIG. 5 is a perspective view of a cross-section of a BCB waveguide with integrated BCB grating. Shown is substrate 50, silicon dioxide layer 54, metal contacts 51, resistive element 53, and exposed BCB 55. This embodiment is discussed in Example 1. The exposed area refers to the area exposed by electron beam lithography. The resistive element can be a NiCr resistor or a resistor composed of some other material. The metal contacts deliver the applied current to the resistive element and can be Titanium/Gold or some other metal or metals. This embodiment is discussed in Example 1.

Figure 6:
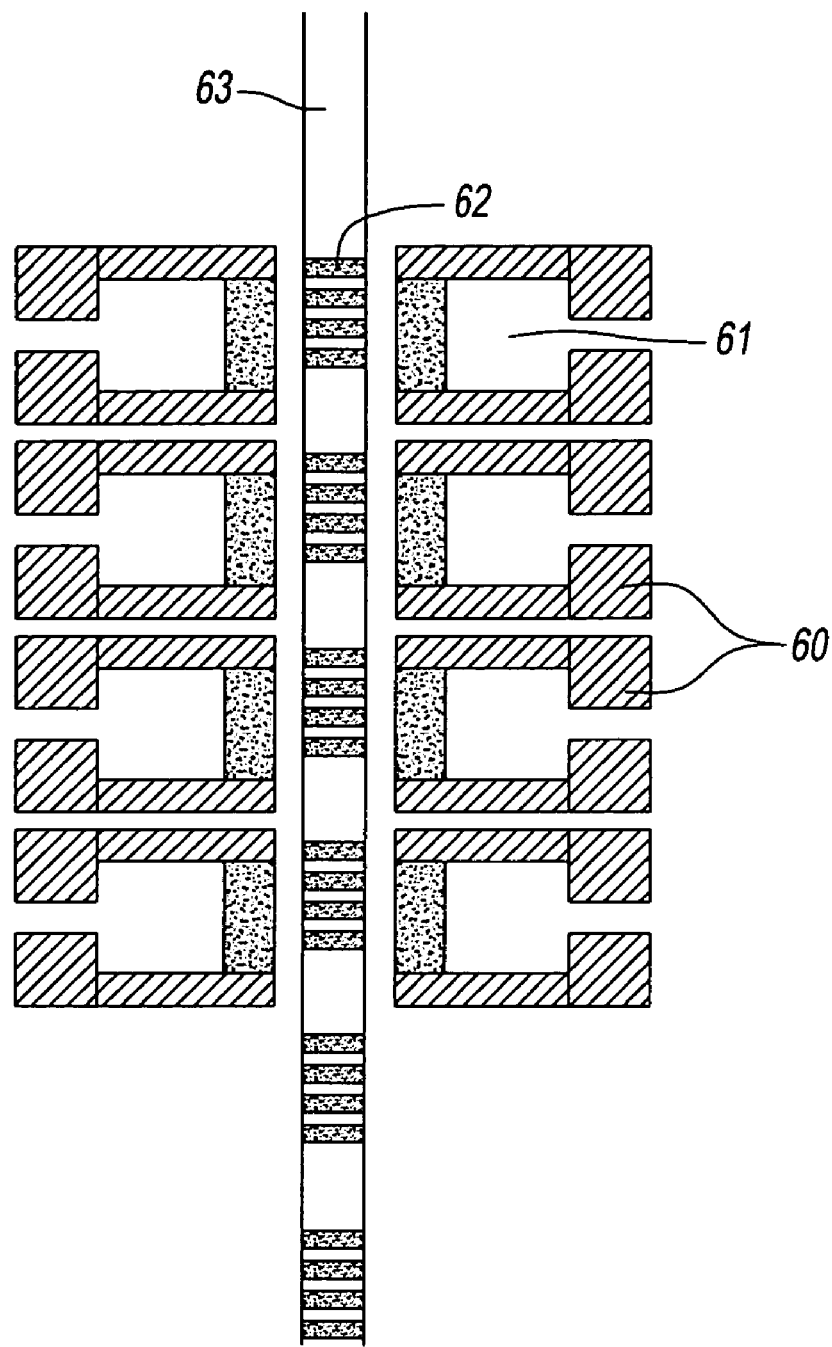
FIG. 6 is a schematic drawing, not to scale, of a BCB waveguide with integrated BCB grating (a top view of a section) having eight integrated resistive elements for tuning 4 sections the grating.

As discussed in Example 6, FIG. 6 is a schematic drawing of a BCB waveguide 63 with integrated BCB grating (top view of a section) having eight integrated resistive elements for tuning. Shown is grating 62, heating element 61, and metal contacts 60. The resistive elements can be a NiCr resistor or a resistor composed of some other material. The metal contacts deliver the applied current to the resistive element and can be Titanium/Gold or some other metal or metals.

Figure 7:
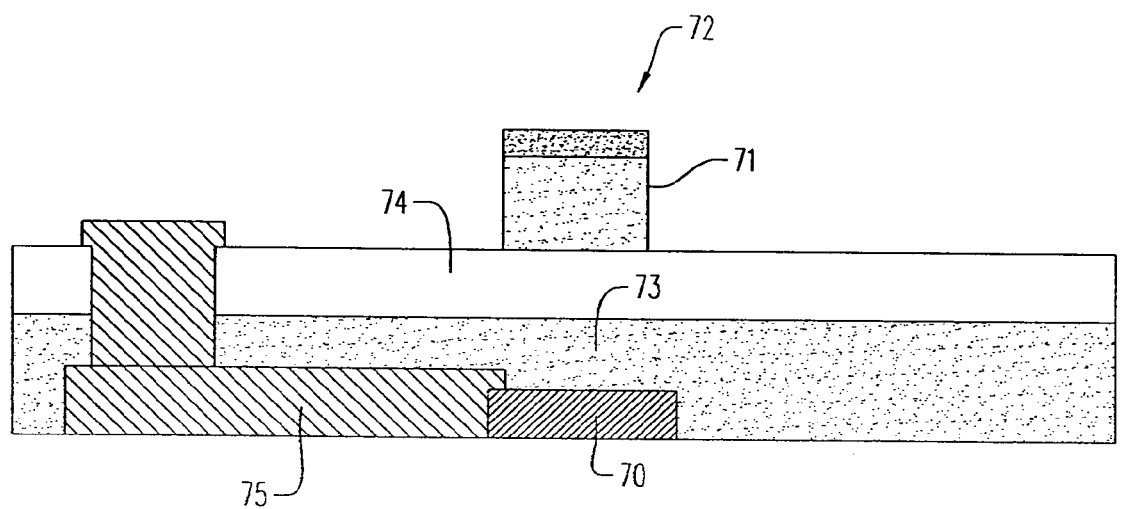
FIG. 7 is a schematic drawing, not to scale, of a BCB waveguide with integrated BCB grating. Shown is a side view of a cross section.

FIG. 7 is a cross-section (side view) schematic drawing of a BCB waveguide with integrated BCB grating discussed in Example 1, with a resistive element for tuning integrated beneath the waveguide. The resistive element can be a NiCr resistor or a resistor composed of some other material. The metal contacts deliver the applied current to the resistive element and can be Titanium/Gold or some other metal or metals. Shown is resistive element 70, BCB waveguide 71, BCB grating 72, BCB 73, silicon dioxide or other low-index material 74, and metal contact 75.

Figure 8:
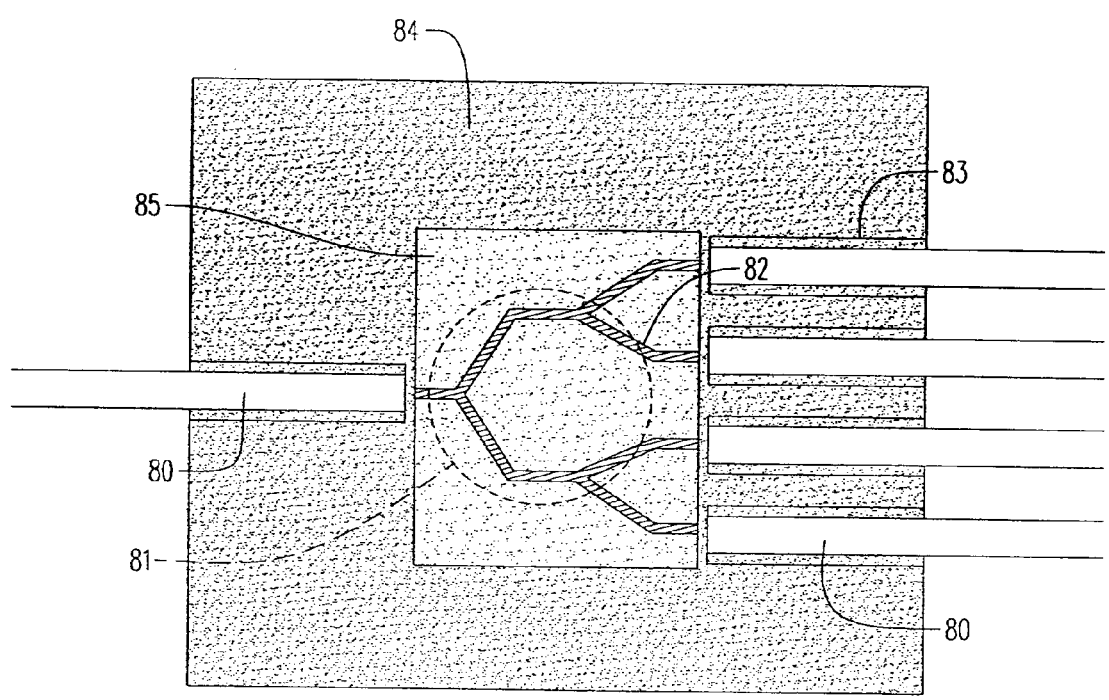
FIG. 8 is a schematic illustration of an example of a 1×8 optical with integrated fiber optic waveguides. The fiber optic waveguides are positioned accurately using Silicon V-grove technology. The dashed circle represents the general area expanded and shown in more detail in FIG. 9 (including metal contacts not shown in this figure).

The schematic diagram of FIG. 8 illustrates an example of a 1×8 optical with integrated fiber optic waveguides. Shown in this diagram are optical fibers 80. The dashed circle 81 indicates the portion of the optical device which is shown in greater dtail in FIG. 9. The location of integrated resistor; also the location of thermally induced waveguides 82, a V-groove structure in Si for aligning 83, a silicon optical bench 84, and BCB photonic crystal 85 (which is located on top of the integrated resistors) are indicated.

Figure 9:
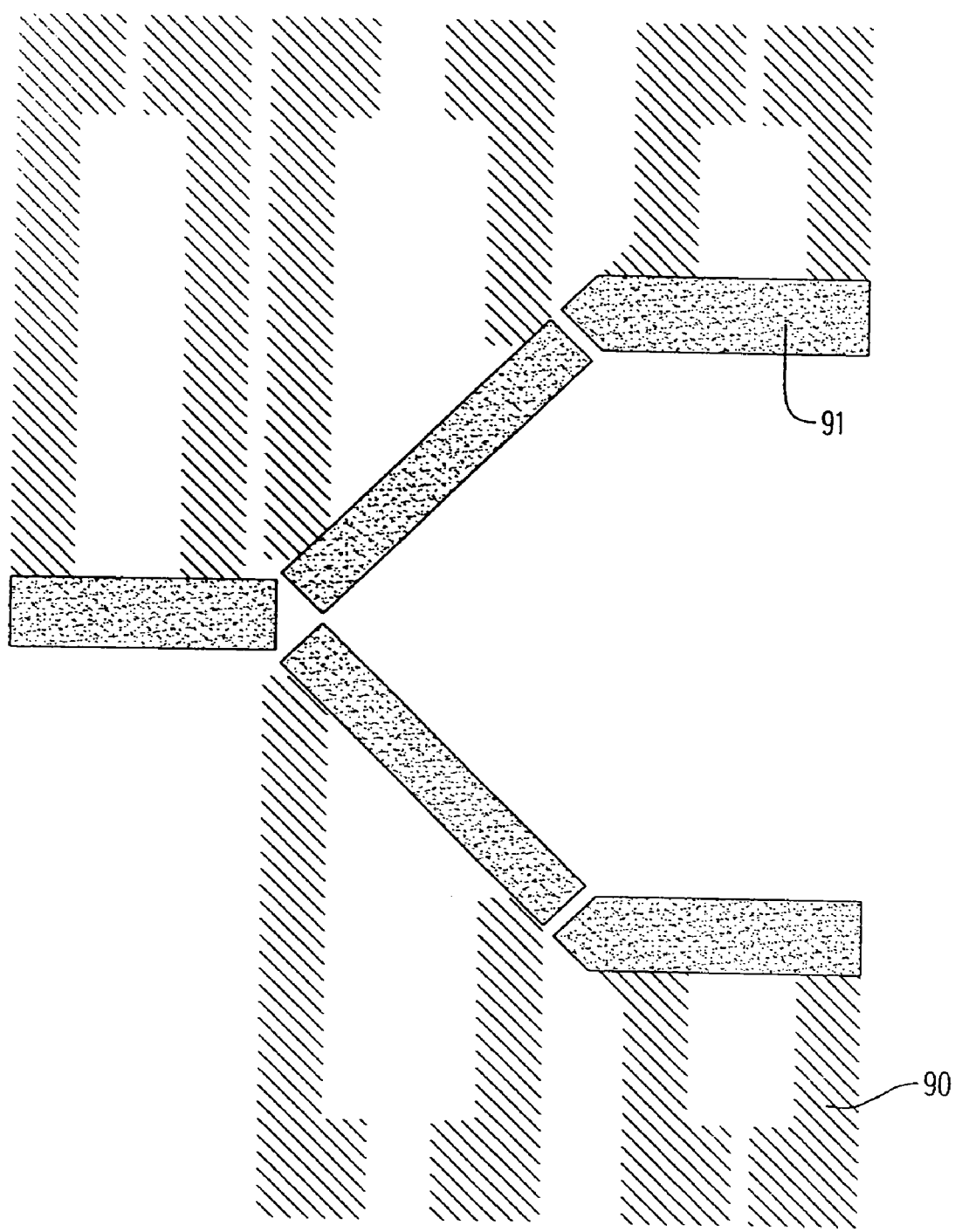
FIG. 9 is a schematic illustration of an integrated resistor configuration with contacts presented in FIG. 8. The resistor configuration in FIG. 8 is shown without contacts. The BCB photonic crystal is located on top of the integrated resistors.

In the illustrated integrated resistor with contacts of FIG. 9, metal contacts 91 and 92 are indicated. FIG. 9 is a more detailed illustration of the delineated area 81 of FIG. 8.

Figure 10:
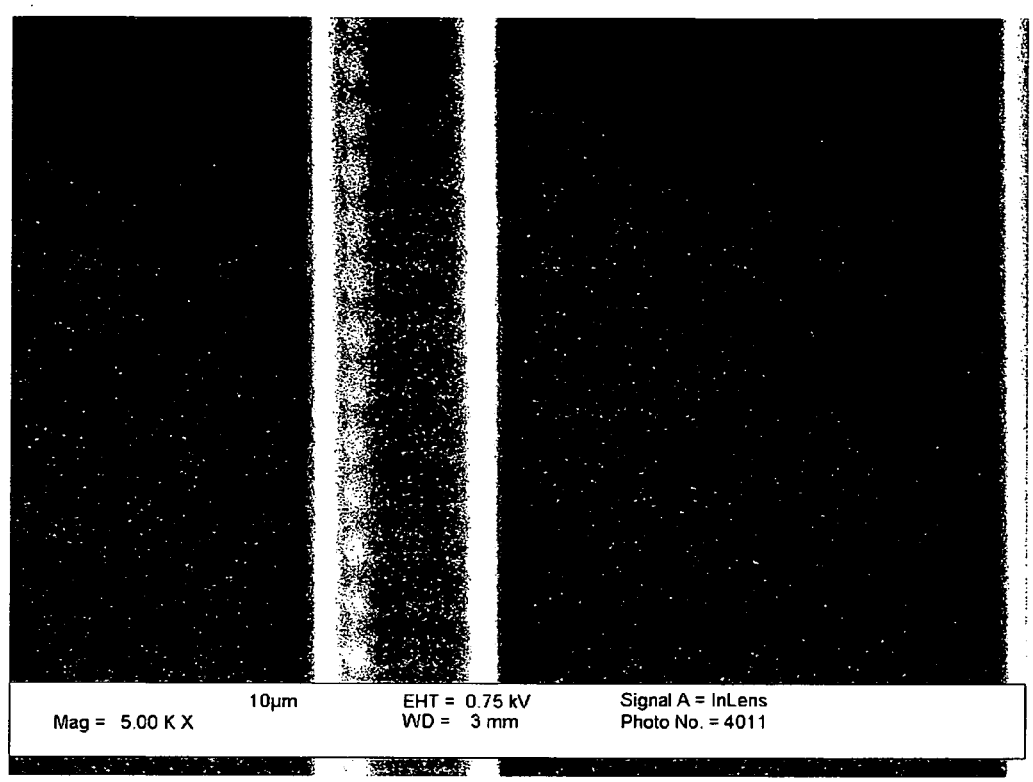
FIG. 10 is a scanning electron photograph of an integrated waveguide and grating fabricated using BCB patterned via optical lithography.
Figure 11:
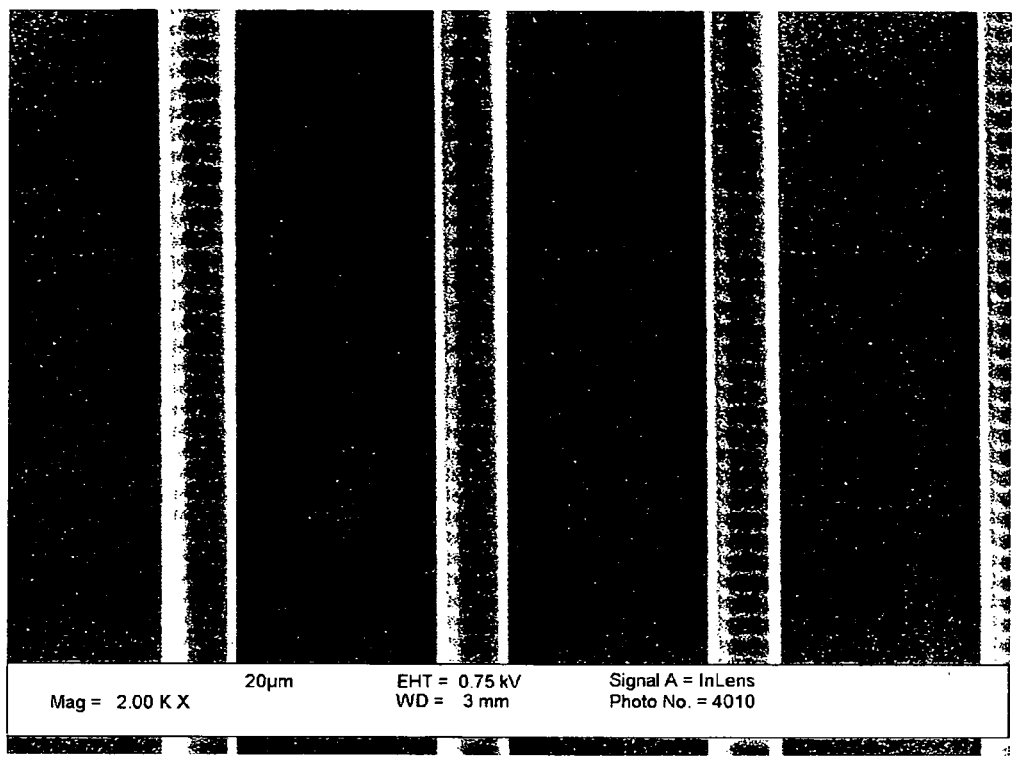
FIG. 11 is a scanning electron photograph of multiple waveguides containing grating fabricated using BCB patterned via optical lithography.

As discussed in Example 1, FIG. 10 is a scanning electron photograph (SEM) of an integrated waveguide and grating fabricated using BCB patterned with optical lithography. As also discussed in Example 1, FIG. 11 is a SEM of multiple waveguides containing grating fabricated using BCB patterned by optical lithography.

Figure 12:
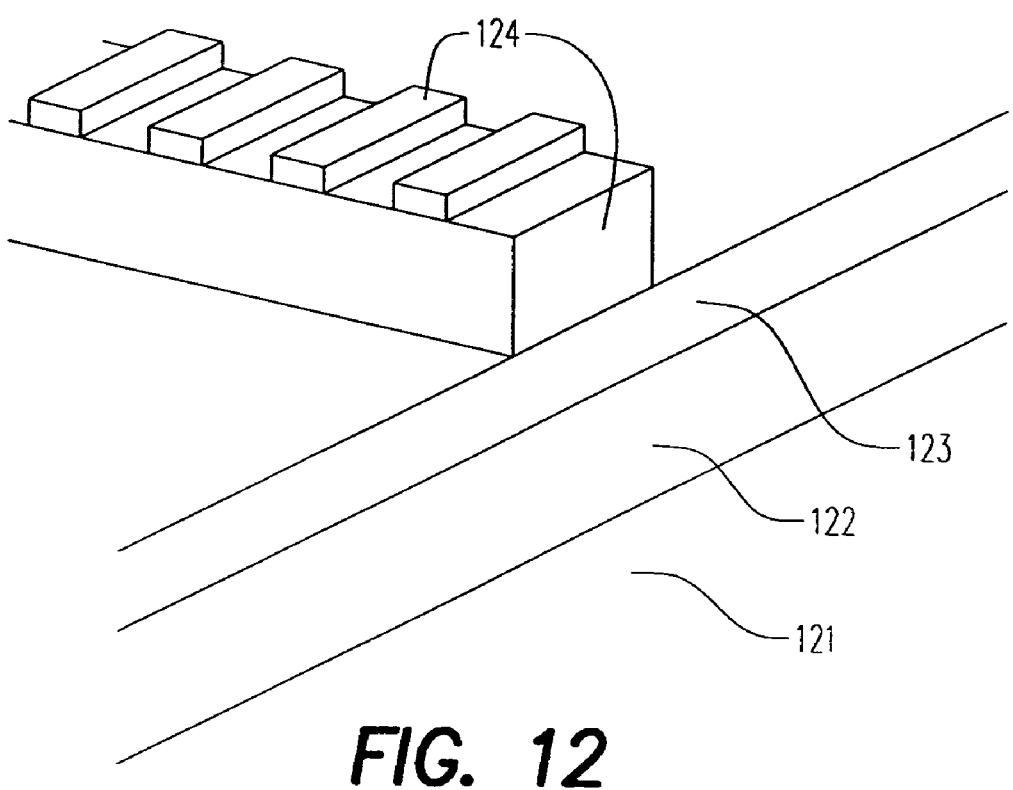
FIG. 12 is a schematic drawing of a BCB waveguide with integrated BCB grating (a perspective view of a cross-section) fabricated on top of a low temperature co-fired ceramic (LTCC) substrate.

A perspective view of a cross-section of a BCB waveguide with integrated BCB grating fabricated on top of a low temperature co-fired ceramic (LTCC) is illustrated in FIG. 12. Series 3000 BCB was used to planarize the substrate prior to depositing the lower cladding layer which, in this case, consists of a spin on glass (SOG). Indicated are LTCC substrate 121, Series 3000 BCB 122, SOG 123, and BCB (exposed area) 124. The exposed area refers to the area exposed by electron beam lithography or optical lithography. Series 3000 BCB is a composition of B-staged divinylsiloxane-bis-20–39%, benzocyclobutene Mesitylene 61–70%, Polymerized 1,2-Dihydro-2,2,4-trimethyl quinoline, 0.01–10%.

Figure 13:
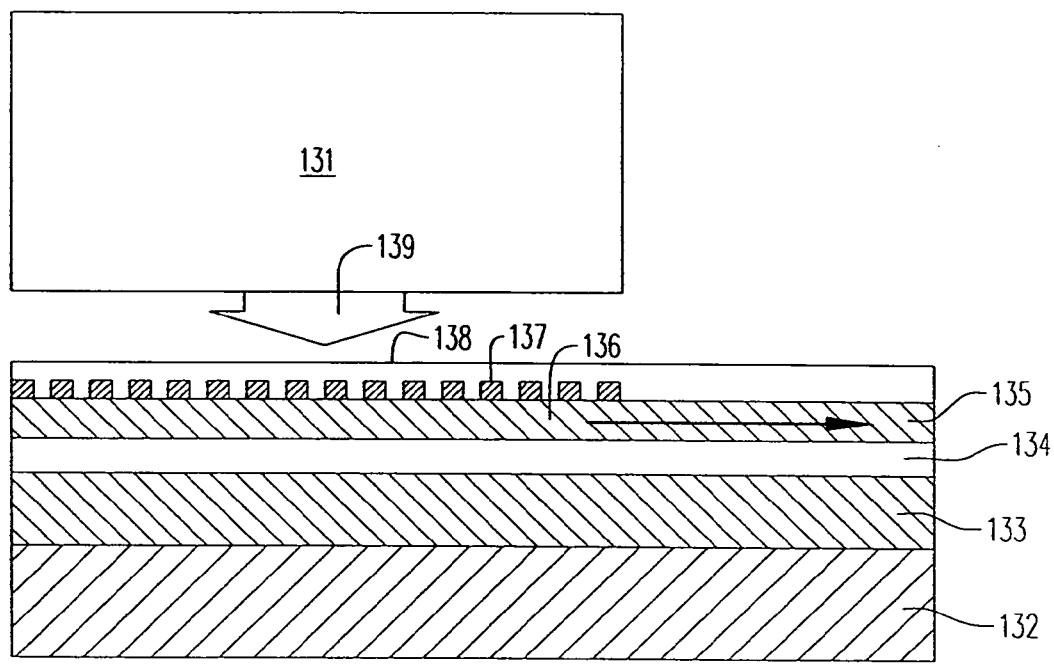
FIG. 13 is a schematic drawing of a cross section of a vertical cavity surface emitting laser (VCSEL) and integrated waveguide grating all disposed on a LTCC substrate.

A schematic illustration of a cross section of a vertical cavity surface emitting laser (VCSEL) and integrated waveguide grating all disposed on a low temperature co-fired ceramic (LTCC) is shown in FIG. 13. The electrical contacts connecting the VCSEL to the LTCC substrate are located outside the plane of the cross section. The VCSEL 131 provides light output 139. Illustrated is spun on glass (SOG) 138 which may be provided if desired. Shown are BCB grating 137, BCB waveguide 136, light coupled into waveguide from VCSEL 135, SOG 134, series 3000 BCB 133, and LTCC substrate 132.

The following processes are unique since they use BCB as either or both the waveguide and/or grating material, which upon curing become essentially one structure. Both the waveguide and grating structures can be fabricated precisely via the use of e-beam lithography and expeditiously since the dose required is low, and the height of the grating can be accurately and reproducibly fabricated by implementing a spin-on or spray deposition processes and by exploiting the planarization properties of BCB. The general processes described below can be implemented using any optically suitable material or combinations of materials, which can be processed in a similar fashion.

An additional advantage to this process is that the waveguide and grating structures can be fabricated on substrates other than Silicon. One critical issue here is, for example, the need for a cladding material with an index of refraction less than that of the BCB to provide confinement in the x and y dimensions of a waveguide, which correspond to the dimensions associated with the width and height of the waveguide. One material that could be used for this purpose is Silicon Dioxide, which has an index of refraction of approximately 1.46, which is less than the index of refraction of BCB, which is approximately 1.52 to approximately 1.55, making Silicon Dioxide material a suitable cladding material. As is known to someone skilled in the art, Silicon Dioxide can be deposited using Plasma Enhanced Chemical Vapor Deposition (PECVD) at temperatures in the range of 25° C. to 100° C. to 200° C., which is a range compatible with many plastic or polymer substrates. There are also other spin-on materials that could be used, such as, for example, spin-on glass. In addition, other optically suitable substrates can be used. These materials in conjunction with the BCB patterning process described herein allow complex optical lightwave circuits to be fabricated on a variety of novel, non-semiconductor as well as semiconductor substrates.

The excellent planarization capability of BCB also allows optical devices to be fabricated on top of many different substrates whose surface is non-planar. One example of a non planar substrate is a ceramic substrate with passive electronic components fabricated on them using, for example, low temperature co-fired ceramic (LTCC) processes. Optical devices such as waveguides and grating structures discussed here can be fabricated on such substrates to make integrated optoelectronic devices. Another example is a printed circuit board (PCB) substrate which could be composed of, for example, FR4 material. FR4 material is typically composed of Continuous Filament Fiber Glass 40–70%, Copper 8–28%, Epoxy Resin 20–30%.

In addition, a critical aspect of using such waveguides to couple light from a device such as vertical cavity surface emitting laser (VCSEL), or to a device such as a photodiode is the ability to couple light propagating in a direction perpendicular to the surface of the substrate to a v mode in a waveguide which is positioned parallel to the surface of the waveguide. This can be done using waveguides with integrated gratings fabricated using processes described here. In this case, second order optical gratings can be used to either couple light into or out of waveguides where the waveguide is positioned parallel to the surface of the substrate and the desired direction of light propagation outside the waveguide is perpendicular or approximately perpendicular to the surface of the substrate.

Example processes are described below to illustrate how waveguide could be integrated with a grating on, for example, Silicon or Plastic or Polymer substrate. Additional examples are given to describe how tunable optical devices employing BCB waveguides and gratings can be developed. Clearly, many variations on these examples will become apparent to anyone skilled in the art.

Accordingly, the present invention is further illustrated by the following Examples which are intended for illustration and not for limitation of the scope thereof.

EXAMPLE 1

BCB Core Waveguide with Integrated BCB Grating

The following example describes a fabrication process for integrating a grating on the top surface of an optical waveguide where both the grating and core waveguide material are, for example, composed of BCB. The waveguide material can be a different material, formed using an entirely different process. Moreover, the waveguide and/or grating material can be fabricated using other optically suitable materials that can be patterned using electron beam and/or optical lithography.

FIG. 1 depicts a schematic illustration of the final structure. One key element in the process involves a second spin deposition of BCB over a BCB waveguide as outlined below. A key in this process is the planarization properties of BCB. BCB can exhibit approximately 90% planarization or, at times, more, leaving the surface of a substrate with features of 1 micron or 2 microns or 3 microns in depth planar to within less than 0.5 microns or in some cases less than 0.2 microns. This depends on the size of the feature as well. This allows, if desired, a thin layer of BCB to be deposited on the surface of a waveguide which may be 1 micron to 3 microns or more in depth, while still maintaining some degree of planarity of the substrate. This thin layer of BCB will be patterned to form the optical grating. Since BCB behaves like a negative resist, the portions of the material which are exposed to an electron beam are not subsequently developed and removed. Thus, a lower dose is required to expose the BCB on the surface of the waveguide and the other areas which are unexposed are removed with the developer, forming a grating structure on the surface of the waveguide.

An example of a process for fabricating a waveguide with integrated grating is summarized below.

Example 1 - Waveguide with BCB core and integrated grating

| | | | JMC/GPL | |
|---|---|---|---|---|
| Step 1 | Deposit lower cladding material | Deposit SiO2 or other suitable cladding material. For low temperature deposition, PECVD techniques can be used. The Thickness of the material will Depend upon the desired Waveguide design. | | eMask means an electronic mask file used by the e-beam system to write a pattern. |
| Step 2 | Fabricate waveguide | Spin on BCB. | | BCB is bisbenzocyclobutene |
| Step 3 | | Soft Bake. | | |
| Step 4 | | Pattern waveguide in BCB using electron beam lithography or optical lithography. | eMask 1 | Or photomask |
| Step 5 | | Develop. | | |
| Step 6 | | Cure. | | This BCB layer is now Insensitive to exposure to an Electron beam. |
| Step 7 | Fabricate grating | Spin on BCB. Since BCB has Excellent planarization Properties, spinning on the BCB At some value above the spin Speed used to form the Waveguide, The spin speed, type of BCB used and level of dilution will vary depending upon the height of the grating desired. | | Note: the dose for this step will be substantially less since only the portion of the BCB on top of the waveguide will be exposed |
| Step 11 | | Soft bake. | | |
| Step 12 | | Write grating pattern on BCB. The grating pattern can extend beyond the edge of the waveguide, just to the edge of The waveguide or be contained Within the waveguide. | eMask 2 | This does not effect the first Layer of BCB. |
| Step 13 | | Develop. | | |
| Step 14 | | Cure. | | |

EXAMPLE 2

BCB Cladding Waveguide with Integrated BCB Grating

This example is similar to Example 1 except the BCB material is used as a cladding material as well as a grating material. Other suitable optical materials may be used which can be patterned using electron beam or optical lithography. A unique aspect of this process is that the waveguide core material can be any optically suitable material which provides an index of refraction appropriate for the design of the waveguide desired. FIG. 2 is a schematic illustration of the final structure. The general process for fabricating the structure is given below.

An example of a process for fabricating a waveguide with a BCB cladding and integrated grating is summarized below.

Example 2 - Waveguide with BCB core and integrated grating

JMC/GPL

| | | | | |
|---|---|---|---|---|
| Step 1 | Deposit lower cladding material | Deposit SiO2 or other suitable cladding material. This step is not needed if the substrate is Glass or other optically suitable material. For low temperature deposition, PECVD techniques can be used. The Thickness of the material will Depend upon the desired waveguide design. | | eMask means an electronic mask file used by the e-beam |
| Step 2 | Fabricate waveguide core | Waveguide material can be any optically suitable material as known to those practicing the art. | | BCB is bisbenzocyclobutene |
| Step 3 | | Spin on BCB as described in example 1. | | |
| Step 4 | Fabricate grating and cladding | Pattern waveguide in BCB using electron beam lithography or optical lithography. | eMask 1 | Or photomask |
| Step 5 | | Develop. | | |
| Step 6 | | Cure. | | This BCB layer is now Insensitive to exposure to an Electron beam. |

EXAMPLE 3

BCB Cladding With BCB Grating Fabricated on Surface

More complex grating structures can be integrated with a waveguide using BCB as a cladding material by curing the BCB fully (no exposure or development) and either 1) Applying an additional thinner layer of BCB (BCB can be thinned by adding Dow T1100, which is B-staged divinyl-siloxane-bis-20–39%, benzocyclobutene Mesitylene 61–70%, Polymerized 1,2-Dihydro-2,2,4-trimethyl quinoline 0.01–10%) on top of the cured BCB (which is insensitive to further optical exposure to electron beam exposure), expose a grating structure using either electron beam or optical lithography and then develop the grating, or 2) Applying an additional layer of another material, such as BCB, curing if required, and then applying another masking material, patterning, developing and etching the grating structure.

Process 1) above is summarized below and a sample structure is shown schematically in FIG. 3.

An example of a process for fabricating a waveguide with a BCB cladding and integrated grating is summarized below.

Example 3 - Waveguide with BCB core and integrated grating

JMC/GPL

| | | | | |
|---|---|---|---|---|
| Step 1 | Deposit lower cladding material | Deposit SiO2 or other suitable cladding material. This step is not needed if the substrate is Glass or other optically suitable material. For low temperature deposition, PECVD techniques can be used. The Thickness of the material will Depend upon the desired waveguide design. | | eMask means an electronic mask file used by the e-beam |
| Step 2 | Fabricate waveguide core | Waveguide material can be any optically suitable material as known to those practicing the art. | | BCB is bisbenzocyclobutene |
| Step 3 | Fabricate cladding | Spin on BCB as described in example 1. | | |
| Step 4 | | Cure. | | This BCB layer is now Insensitive to exposure to an Electron beam. |
| Step 5 | | Spin on thinned BCB as Described in ref. [1] (PSU Provisional Patent) | | |
| Step 6 | | Pattern waveguide in BCB using electron beam lithography or optical lithography. | eMask 1 | Or photomask |

| | | | |
|---|---|---|---|
| | | -continued | |
| | Example 3 - Waveguide with BCB core and integrated grating | | |
| | | | JMC/GPL |
| Step 7 | Develop. | | |
| Step 8 | Cure. | This BCB layer is now Insensitive to exposure to an Electron beam. | |

EXAMPLE 4

Dual Exposure Technique for Fabricating BCB Gratings

One key process improvement for the realization of devices using the general process described below is the implementation of a two step lithography process for forming the waveguide cladding and grating sections. In the case where a material such as BCB is used for the cladding material, which is behaving like a negative electron beam resist, a much longer write time may be required since, in this case, a large portion of the final substrate may need to be written in order to, for example, maintain a completely planar or near planar surface. This is in contrast to example 5a, where only the grating itself and the waveguide are actually exposed to an electron beam, substantially reducing the time required to write or expose a sample. In order to substantially reduce the amount of time required to expose and process a sample, a two step lithography method can be used. The 4000 series BCB material we have examined can also be patterned via optical lithography. Optical lithography is, by comparison to electron beam lithography, a much faster process since the entire sample is exposed at the same time. One difficulty with optical lithography is that the required resolution or minimum feature size achievable may be larger than that required to fabricate a device, such as, for example, a grating, which exhibits useful characteristics. In this case, a combination of electron beam and optical lithography can be used to completely pattern a sample. In this case, the area containing the features with the critical dimensions is first exposed using electron beam lithography. An area surrounding this area is also written where the area is of equal or greater size than the combined alignment and feature resolution achievable with the available optical lithography process. This area can be, for example, 1 micron to 3 microns.

A process for patterning high resolution features using a material which can be patterned using both electron beam and optical lithography and where the material is behaving like a negative resist is given below.

An example of a process for patterning high resolution features using a material which can be patterned using both electron beam and optical lithography and where the material is behaving like a negative resist:

| | | | JMC/GPL | |
|---|---|---|---|---|
| Step 1 | Deposit lower cladding material | Deposit SiO2 or other suitable cladding material. This step is not needed if the substrate is Glass or other optically suitable material. For low temperature deposition, PECVD techniques can be used. The Thickness of the material will Depend upon the desired waveguide design. | | eMask means an electronic mask file used by the e-beam system to write a pattern. |
| Step 2 | Fabricate waveguide core | Waveguide material can be any optically suitable material as known to those practicing the art. | | BCB is bisbenzocyclobutene |
| Step 3 | | Spin on BCB as described in example 5a. | | |
| Step 4 | Fabricate grating and cladding | Pattern waveguide in BCB using electron beam lithography or optical lithography. | eMask 1 | Or photomask |
| Step 5 | | Develop. | | |
| Step 6 | | Cure. | | This BCB layer is now Insensitive to exposure to an Electron beam. |

EXAMPLE 5

Novel Waveguide and Grating Structures

Using processes described above or variations of processes described above, many other waveguide and, for example, grating type structures can be developed. In one example of one possible type of such a structure is where the waveguide and grating are spatially separated, but still interact as one device or optical circuit. One possible example is an optical filter as shown schematically in FIG. 4. Other waveguide geometries are possible.

EXAMPLE 6

Thermally Tunable Grating Structures

As discussed previously, optical devices whose wavelength response can be tuned are of critical importance in applications such as optical telecommunications. One approach to tuning the wavelength response of an optical device is to use the change in refractive index of a material by changing the temperature. In addition, more detailed tuning can be achieved by varying the temperature of different sections of a device independently. A temperature change can be introduced to a device by, for example, integrating a resistive element into the device structure. An example of this is shown in FIG. 5, where a schematic drawing of a BCB waveguide with integrated BCB grating (a perspective view of a cross-section) as discussed in Example 1 is shown. The exposed area refers to the area exposed by electron beam lithography. The resistive element can be a NiCr resistor or a resistor composed of some other material. The metal contacts deliver the applied current to the resistive element and can be Titanium/Gold or some other metal or metals.

Many of these resistors can be integrated to create a desired temperature distribution. This is shown schematically in FIG. 6. The current flowing through any of the eight resistors, which determines how much heat is generated by the resistor, can be varied independently by, for example, varying the voltage across the individual resistor. The voltage is applied to the metal contacts.

Yet another approach involves placing the resistive element under the device structure. In this case, the surface of the wafer after fabrication of the resistors and contacts can be uniquely planarized using BCB, since BCB exhibits excellent planarization properties after deposition (>90% planarization of surface possible using standard processes available from manufacturer). Silicon Dioxide or another material with a low index of refraction can be deposited and any of the structures discussed in the above examples could then be fabricated. This is shown schematically in FIG. 7. The contact structure shown can be fabricated in several ways including a combination of thermal and/or electron gun metal evaporation and electroplating as known to anyone skilled in the art.

By using resistive elements integrated under the device structure as shown in FIG. 7, several other device geometries can be made. One additional example is a tunable two dimensional photonic crystal for optical switching applications. A photonic crystal can be designed to prevent the propagation of light at certain frequencies or to allow the propagation of light at certain other frequencies. For such a photonic crystal, the transition between the frequencies where light can propagate and where light cannot propagate is often referred to as the band edge. Arbitrarily shaped optical wageguides can be formed in photonic crystals by fabricating a photonic crystal which exhibits a band edge position which does not permit the propagation of light and then somehow tuning locally, where an optical waveguide is desired, the band edge of that crystal so that light can propagate in that region. This band edge can be shifted by thermally changing the index of refraction as discussed above. The design of such photonic crystals is known to anyone skilled in the art. An example of a 1×4 optical switch (a specific example of a 1×N optical switch) with integrated fiber optic waveguides is shown schematically in FIG. 8. The fiber optic waveguides are positioned accurately using Silicon V-grove technology. The photonic crystal grating can be fabricated in many ways including that summarized, for example, in example 1 above. A unique geometry for patterning the resistive elements is also shown to facilitate formation of an optical waveguide by locally thermally shifting the band edge of the photonic crystal to a point where the desired frequencies of light can be transmitted. An expanded view of this is shown in FIG. 9. Both figures are not to scale. The relatively sharp bends in the thermally induced waveguides created by the thermal elements shown in FIGS. 8 and 9 are possible, if desired, using photonic crystal based waveguides. The resistive element is unique since it allows any branch of a waveguide to be continuously formed. The actual temperature and thus waveguide distribution will depend in practice upon how the device is mounted, the actual layer structure, size, etc.

EXAMPLE 7

Integrated Waveguide and Grating Structure Fabricated on Top of a LTCC Circuit The following example describes a process for fabricating an integrated waveguide and grating structure on top of a LTCC circuit. This process used the planarization capabilities of BCB. The process is shown in the table below. The final structure is shown in FIG. 12.

Example 7 - BCB waveguide and grating on LTCC

JMC/GPL

| | | | | |
|---|---|---|---|---|
| Step 1 | Planarize LTCC substrate surface | Spin on Series 3000 BCB and cure. This is to planarize surface. Process can be repeated. | | eMask means an electronic mask file used by the e-beam system to write a pattern. |
| Step 2 | Deposit lower cladding material | Deposit SiO2, spin on glass (SOG), or other suitable cladding material. Cure, if required. For low temperature deposition, PECVD techniques can be used. The Thickness of the material will depend upon the desired Waveguide design. | | |
| Step 3 | Fabricate waveguide | Spin on photosensitive BCB. | | BCB is bisbenzocyclobutene |
| Step 4 | | Soft Bake. | | |
| Step 5 | | Pattern waveguide in BCB using electron beam lithography | eMask 1 | Or photomask |

-continued

Example 7 - BCB waveguide and grating on LTCC

| | | JMC/GPL | |
|---|---|---|---|
| Step 6 | | or optical lithography.<br>Develop. | |
| Step 7 | | Cure. | This BCB layer is now Insensitive to exposure to an Electron beam. |
| Step 8 | Fabricate grating | Spin on photosensitive BCB. Since BCB has Excellent planarization properties, spinning on the BCB At some value above the spin speed used to form the waveguide, The spin speed, type of BCB used and level of dilution will vary depending upon the height of the grating desired. | Note: the dose for this step will be substantially less since only the portion of the BCB on top of the waveguide will be exposed |
| Step 9 | | Soft bake. | |
| Step 10 | | Write grating pattern on BCB. The grating pattern can extend beyond the edge of the waveguide, just to the edge of The waveguide or be contained Within the waveguide. | eMask 2 | This does not effect the first Layer of BCB. |
| Step 11 | | Develop. | |
| Step 12 | | Cure. | |

EXAMPLE 8

Integrated Waveguide and Second Order Grating Structure Fabricated on Top of a LTCC Circuit with a VCSEL Mounted above the Grating The following example describes an arrangement for coupling the output of a vertical cavity surface emitting laser (VCSEL) to a waveguide with integrated grating structure where both the VCSEL and waveguide have been mounted on the surface of a LTCC substrate. The waveguide grating structure is very similar to that described in Example 7. The spacing between the VCSEL and grating will be determined primarialy by the metal contact material, which can be in the form of a reflowable solder paste or even epoxy bumps. The grating itself, however, would be a second order grating and can be of an unconventional shape to allow for misalignment of the VCSEL to the grating. A cross section of the arrangement is shown in FIG. 13. This geometry can also be used to couple light out of a waveguide to a photodiode, for example, which would be mounted in a position similar to the VCSEL shown in FIG. 13. Again the purpose of using the second order grating is to couple the light out of the waveguide and allow its direction of propagation to be surface normal.

Although the present invention describes in detail certain embodiments, it is understood that variations and modifications exist known to those skilled in the art that are within the invention. Accordingly, the present invention is intended to encompass all such alternatives, modifications and variations that are within the scope of the invention as set forth in the following claims.

What is claimed is:

1. An optical device comprising:
at least one BCB waveguide structure;
at least one BCB grating structure disposed on said at least one BCB waveguide structure;
cladding material on which said at least one waveguide structure is disposed; and optionally
a substrate on which said cladding material is disposed, wherein at least one feature of said grating or waveguide is nano-scale.

2. The device of claim 1, wherein said substrate is low temperature co-fired ceramic.

3. The device of claim 2, wherein BCB is disposed on said low temperature co-fired ceramic.

4. The device of claim 2, further comprising at least one optical fiber.

5. The device of claim 1, wherein said cladding material has an index of refraction less than said at least one BCB waveguide structure.

6. The device of claim 1, wherein said cladding material is selected from the group consisting of: spin on glass and silicon dioxide.

7. The device of claim 1, wherein said substrate is selected from the group consisting of: semiconductors glasses, plastics, polymers, metals, ceramics, insulators, organic materials, inorganic materials, and any combinations thereof.

8. The device of claim 1, wherein at least one feature of said waveguide is from 5 nanometers to 50 nanometers in size.

9. The device of claim 1, wherein at least one feature of said grating structure is from 5 nanometers to 50 nanometers in size.

10. The device of claim 1, wherein said device has a plurality of waveguide structures.

11. The device of claim 1, wherein said device has a plurality of grating structures.

12. The device of claim 1, further comprising at least one resistive element.

13. The device of claim 1, further comprising at least one metal contact.

14. The device of claim 1, wherein said cladding material is applied to said substrate by plasma enhanced chemical vapor deposition.

15. A tunable optical device having at least one integrated waveguide and grating structure comprising:
- a substrate material containing one or more electrically contacted heat producing elements;
- a cladding material disposed on said substrate;
- at least one waveguide structure disposed on said cladding material;
- at least one grating structure disposed on or near said waveguide structure; wherein said waveguide structure and/or said grating structure are in close proximity to said thermal element.

16. The device of claim 15, wherein said grating is composed of bisbenzocyclobutane (BCB).

17. The device of claim 15, wherein said cladding material is applied to said substrate by plasma enhanced chemical vapor deposition.

18. A tunable optical device having at least one integrated waveguide and grating structure comprising:
- a substrate material containing one or more electrically contacted heat producing elements;
- a planarizing material disposed on top of said heat producing elements;
- a cladding material disposed on said planarizing material;
- at least one waveguide structure disposed on said cladding material;
- at least one grating structure disposed on or near said waveguide structure; wherein said waveguide structure and/or said grating structure are in close proximity to said thermal element.

19. The device of claim 18, wherein said planarizing material is bisbenzocyclobutene (BCB).

20. The device of claim 18, wherein said grating is composed of bisbenzocyclobutene (BCB).

* * * * *